(12) United States Patent
Yoshii

(10) Patent No.: US 6,560,359 B2
(45) Date of Patent: *May 6, 2003

(54) DATA PROCESSING METHOD AND APPARATUS

(75) Inventor: Hiroto Yoshii, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,448

(22) Filed: Jul. 9, 1998

(65) Prior Publication Data

US 2002/0057841 A1 May 16, 2002

(30) Foreign Application Priority Data

Jul. 11, 1997 (JP) ............................................ 9-187019

(51) Int. Cl.$^7$ ............................. G06K 9/34; G06K 9/18; G06K 9/68
(52) U.S. Cl. ........................ 382/173; 382/195; 382/227
(58) Field of Search ............................... 382/185, 224, 382/225, 226, 227, 173, 177, 195

(56) References Cited

U.S. PATENT DOCUMENTS

| 4,685,142 A | * | 8/1987 | Ooi et al. ..................... 382/185 |
| 5,325,445 A | * | 6/1994 | Herbert ....................... 382/225 |
| 5,634,087 A | * | 5/1997 | Mammone et al. ............ 706/25 |
| 5,787,194 A | * | 7/1998 | Yair ............................. 382/173 |
| 5,982,933 A | * | 11/1999 | Yoshii et al. ................. 382/226 |
| 6,233,352 B1 | * | 5/2001 | Yoshii ......................... 382/157 |

OTHER PUBLICATIONS

H. Yoshii, "Binary PACT"; IEEE Proceedings on Pattern Recognition, ISBN: 0–8186–7282–X, vol. 3, pp. 606–610, Aug. 1996.*
Nadler et al, "Pattern Recognition Engineering"; ISBN: 0–471–62293–1, pp. 340–345, and 417–418, Jun. 1992.*
C. L. Nehaniv, "Algebraic Engineering of Understanding: Global Hierarchical Coordinates on Computation for the Manipulation of Data, Knowledge, and Process"; IEEE Proceedings on Computer Software and Applications Conference, ISBN: 0–8186–6705–2, pp. 418–425, Nov. 1994.*
Classification and Regression Trees, Leo Breiman, et al., pp. 102–111, Chapman & Hall, New York (1984).

* cited by examiner

Primary Examiner—Amelia M. Au
Assistant Examiner—Mehrdad Dastouri
(74) Attorney, Agent, or Firm—Fitzpatrick, Cella, Harper & Scinto

(57) ABSTRACT

A hierarchical-segmenting pre-processor hierarchically segments the axis of each coordinate of a characteristic value used for classifying a pattern to decide a threshold value for each dimension, and generates hierarchized learning patterns which indicate a segment of the segmented coordinate axis to which each coordinate of the characteristic value of the learning pattern belongs. A developing variable determining unit selects a dimension (variable) having the highest classification efficiency in each node of a classification tree. A classification tree generator generates a classification tree based on the dimension (variable) obtained by the developing variable determining unit and a threshold value set in the dimension.

38 Claims, 13 Drawing Sheets

Y COORDINATE

X COORDINATE

FIG. 14

| 1'ST DIMENSION (X COORDINATE OF STARTPOINT OF FIRST STROKE) ||
|---|---|
| SEGMENT | CATEGORY |
| 1 - 1 | あ　い ・・・・・・ |
| 1 - 2 | く ・・・・・・ |
| 2 - 1 | ・・・・・・ |
| 2 - 2 | あ ・・・・・・ |
| ⋮ | ⋮ |
| 3 - 1 | ・・・・・・ |
| 3 - 2 | あ ・・・・・・ |
| ⋮ | ⋮ |
| 3 - 8 | ・・・・・・ |

| 2'ND DIMENSION (Y COORDINATE OF STARTPOINT OF FIRST STROKE) ||
|---|---|
| SEGMENT | CATEGORY |
| 1 - 1 | あ ・・・・・・ |
|  |  |

DATA PROCESSING METHOD AND APPARATUS

BACKGROUND OF THE INVENTION

The present invention relates to a data processing method and apparatus for generating a classification tree utilized to recognize a pattern such as an image, character, audio or the like.

As disclosed in reference "Classification and Regression Trees" by Breiman, Friedman, Olshen and Stone, it is a known method to classify a pattern by using a so-called classification tree. The method has advantages in that the recognition speed is relatively fast and that the method is applicable to recognizing any types of patterns. Therefore, the method is widely used for pattern recognition of an image, character, audio or the like.

However, the method also has a disadvantage in that generation of a classification tree, used for classifying a pattern, is time consuming. Particularly, if the number of dimensions of a characteristic value space representing the pattern is large, an extremely large amount of time is required to generate a classification tree.

For instance, for each node of the classification tree, a certain dimension of a characteristic value space is looked at, and determination is made as to whether or not the coordinate in the object dimension of the input pattern is larger/smaller than a predetermined value. The "predetermined value" used herein is normally called a "threshold value." In other words, when generating a classification tree, decision cannot be made for each node unless it is determined "which dimension of the n dimensions should be looked at?" and "where in the coordinate axis of the object dimension the threshold value is set?" More specifically, with respect to each of all dimensions (n dimensions), a threshold value that achieves highest classification efficiency is obtained (the total number of the obtained threshold values is n), and a dimension and a threshold value that can attain the highest classification efficiency among all the dimensions are obtained. In this manner, each node of the classification tree is generated.

SUMMARY OF THE INVENTION

The present invention is made in consideration of the above situation, and has as its object to provide a data processing method and apparatus which enables to generate, at high speed, a classification tree for classifying a pattern having a characteristic value expressed in a plurality of dimensions.

Another object of the present invention is to provide a data processing method and apparatus which can generate a classification tree that realizes a high recognition success rate even if the number of learning patterns provided is small.

To attain the above objects, the present invention provides a data processing method for generating a classification tree for classifying a pattern, comprising: a step of hierarchically segmenting a coordinate axis of a characteristic value space, and generating a plurality of coordinate-axis segments and threshold values corresponding to these segments; a step of generating hierarchy information indicative of coordinate-axis segments to which a characteristic value of each of a plurality of learning patterns belongs; and a step of selecting a dimension of the characteristic value space and a threshold value as a classification condition of each node of the classification tree, based on a distribution of the plurality of learning patterns in the hierarchy information.

Furthermore, in order to attain the above objects, the present invention provides a data processing method for generating a classification tree for classifying a pattern, comprising: a step of hierarchically segmenting a coordinate axis of a characteristic value space, and generating a plurality of coordinate-axis segments and threshold values corresponding to these segments; a step of deriving learning sub-patterns from each of a plurality of learning patterns, each of which is represented by combinations of dimensions of a characteristic value space; a first generating step of generating, for each of the combinations of dimensions, hierarchy information indicative of coordinate-axis segments to which a characteristic value of each of a plurality of learning sub-patterns belongs; and a second generating step of generating a classification tree for each of the combination of dimensions, by selecting a dimension of the characteristic value space and a threshold value as a classification condition of each node of the classification tree, based on a distribution of the plurality of learning patterns in the corresponding hierarchy information.

Moreover, according to another embodiment of the present invention, a data processing apparatus which realizes the aforementioned data processing method can be provided. Furthermore, according to another embodiment of the present invention, a memory medium storing control programs for causing a computer to execute the aforementioned data processing method, can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 14 is a diagram showing an example of hierarchized learning data.

DETAILED DESCRIPTION OF THE PREFERRED EMBODIMENTS

Preferred embodiments of the present invention will be described in detail in accordance with the accompanying drawings.

First Embodiment

Figure 1:
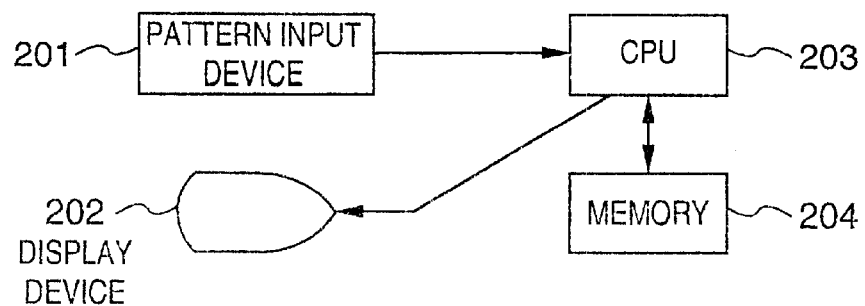
FIG. 1 is a block diagram showing a general structure of a data processing apparatus according to a present embodiment.

FIG. 1 is a block diagram showing a general structure of a data processing apparatus to which the pattern recognition method according to each of the following embodiments is applied. As shown in FIG. 1, the data processing apparatus (pattern recognition apparatus) according to the present embodiment is constructed by a pattern input device 201, display device 202, central processing unit (CPU) 203 and memory 204.

In a case of an apparatus performing on-line character recognition, the pattern input device 201 includes a digitizer and a pen, for transferring character data handwritten on the digitizer by a user using the pen, or coordinates data representing graphics to the CPU 203. In a case of an apparatus performing audio recognition, the pattern input device 201 includes a microphone. In other words, the pattern input device 201 may be a scanner, camera or the like as long as a pattern subjected to recognition can be inputted. The display device 202 displays pattern data inputted into the pattern input device 201 or a text obtained as a result of pattern recognition executed by the CPU 203. The text may be printed by a printer such as an ink-jet printer or the like. The CPU 203 performs various control operation in the data processing apparatus, e.g., recognition processing of an inputted pattern, according to program codes stored in the memory 204. The memory 204 includes a ROM for storing recognition programs used by the CPU 203 and a dictionary for pattern recognition, and a RAM for temporarily storing inputted pattern data and variables for the recognition programs. The memory 204 also stores program codes executed by the CPU 203 for performing the processing to be described later with reference to accompanying flowcharts. The program codes may be received from another terminal via a communication line (public line, LAN or the like) and stored in the memory 204.

Figure 2:
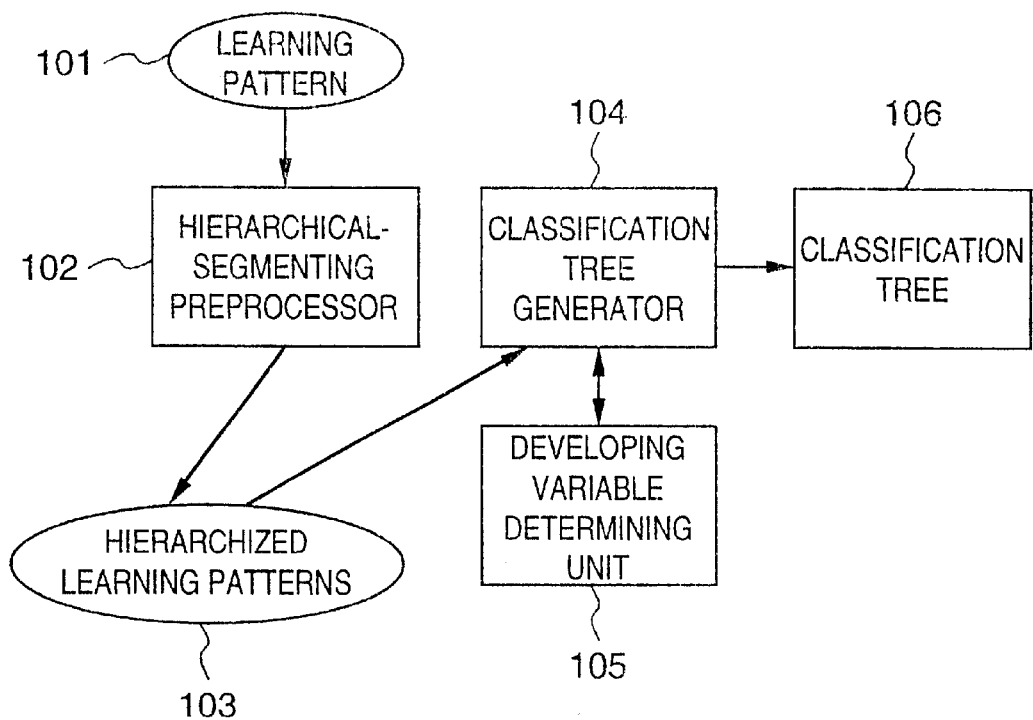
FIG. 2 is an explanatory diagram showing control structure for generating a classification tree according to the first embodiment.

FIG. 2 is an explanatory diagram showing control structure for generating a classification tree according to the first embodiment. In FIG. 2, reference numeral 101 denotes original learning patterns; 102, a hierarchical-segmenting preprocessor for hierarchically segmenting, in advance, each coordinate axis of a characteristic value space used for classification; 103, hierarchized learning patterns which have been hierarchically segmented by the preprocessor 102; 104, a classification tree generator for generating a classification tree based on the hierarchized learning patterns 103; 105, a developing variable determining unit utilized by the generator 104 in the process of generating a classification tree; and 106, a classification tree generated by the generator 104. It should be noted that in the first embodiment, the "original learning patterns 101" is the input and the "classification tree 106" is the output.

Figure 3A:
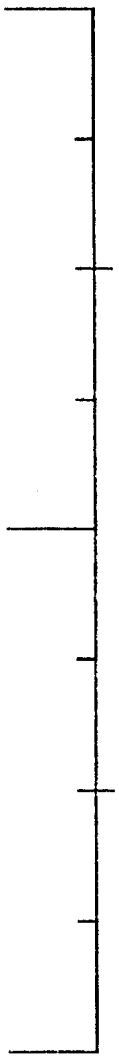
FIGS. 3A to 3C are explanatory views for explaining segmentation of a characteristic value by a hierarchical-segmenting preprocessor 102.
Figure 3B:
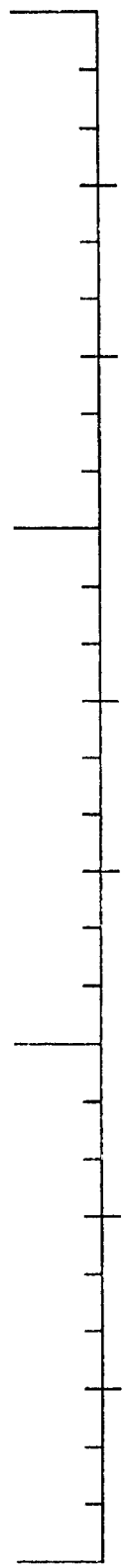
Figure 3C:
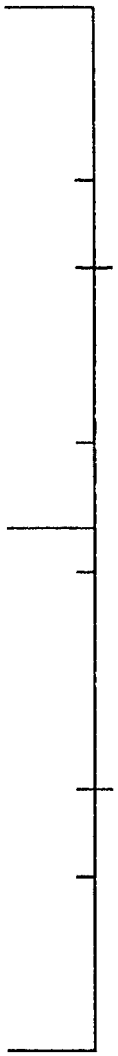

FIGS. 3A to 3C are explanatory views for explaining segmentation of a coordinate axis in a characteristic value space by the hierarchical-segmenting preprocessor 102. Generally, a pattern can be expressed by using a vector having n dimensions (n coordinates). As disclosed in the aforementioned reference "Classification and Regression Trees," when a given value of "n" is large, a coordinate of certain dimension of the characteristic value (vector) is looked at for each node of the classification tree, and determination is made as to whether or not the value of the coordinate is larger/smaller than a predetermined value. The "predetermined value" used herein is normally called a "threshold value." In other words, when generating a classification tree, "Decision" cannot be formed for each node unless it is determined "which dimension of the n dimensions should be looked at?" and "where in the coordinate axis of the object dimension, the threshold value is set?" More specifically, with respect to each of the dimensions (n dimensions), a threshold value that achieves highest classification efficiency and the classification efficiency are obtained (the total number of the obtained threshold values is n), then a dimension and a threshold value that can attain the highest classification efficiency among all the dimensions are obtained. Therefore, as the number of the dimensions of the characteristic value space increases, the amount of calculation increases, requiring a large amount of time for generating a classification tree.

In the present embodiment, as shown in FIG. 3A, the coordinate axis of each of the n dimensions is recurrently divided in half, in advance. By virtue of this process, it is possible to omit the aforementioned process of determining "where in the coordinate axis, the threshold value is to be set?"

Note that the foregoing description in FIG. 3A is the case of generating a classification tree having a binary-tree structure. The coordinate axis does not have to be divided in two, but may be divided in three as shown in FIG. 3B. Alternately, the coordinate axis does not have to be equally divided, but may be unequally divided as shown in FIG. 3C.

As described above, the hierarchical-segmenting preprocessor 102 divides each coordinate axis in the characteristic value space, used for classifying the pattern, according to a predetermined method, thereby determining in advance a threshold value to be used in each node of the classification tree.

Hereinafter, the steps of generating a classification tree using the aforementioned configuration will be described. The description will be provided, using an example where the present invention is applied to an on-line handwritten character recognition technique. It should be noted that the present invention can be applied to general pattern recognition techniques such as audio recognition, optical character recognition (OCR) or the like.

Figure 4:
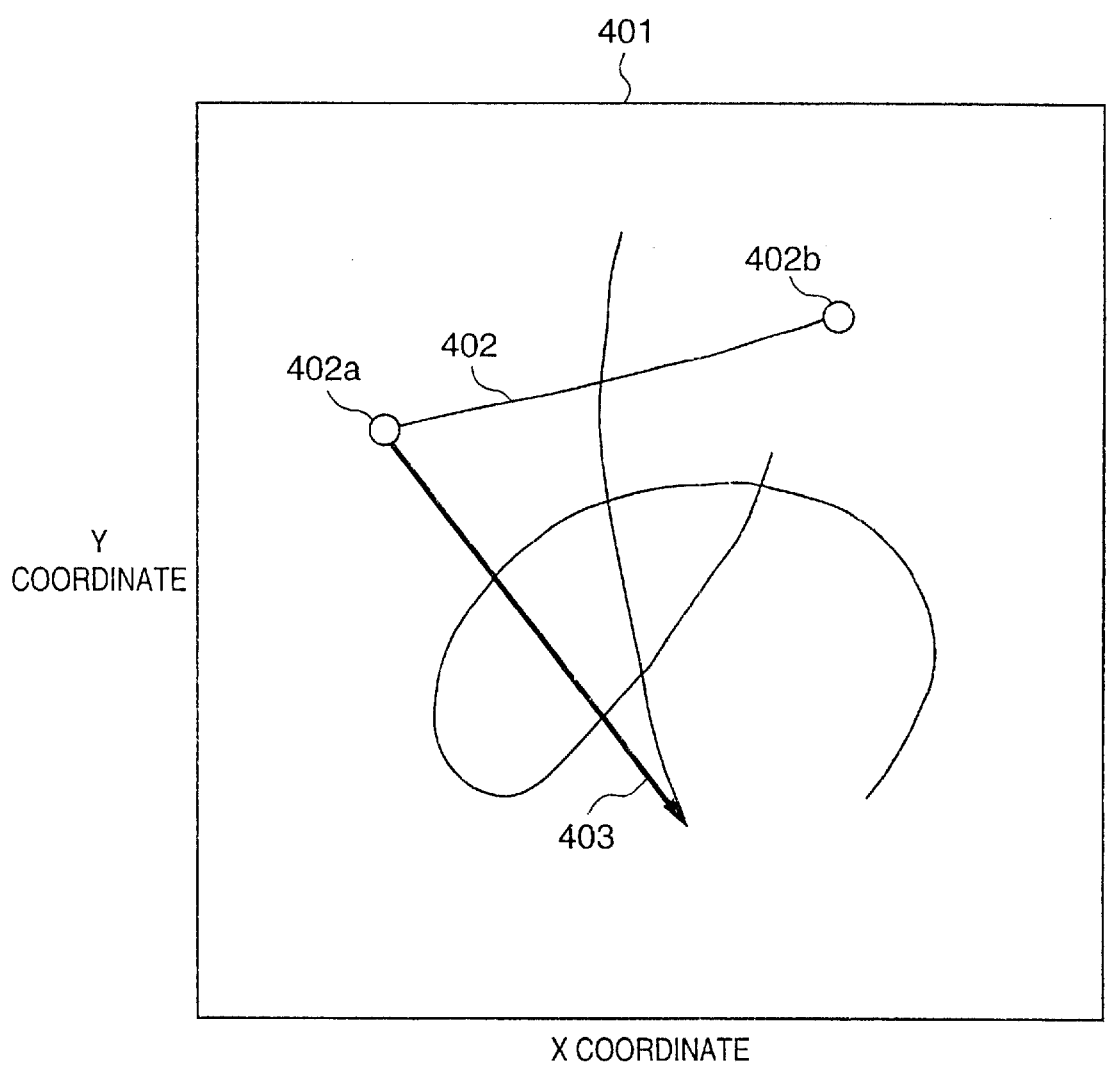
FIG. 4 is a view for explaining pattern description by the data processing apparatus according to the present embodiment.

First, a characteristic value which is used to represent a pattern will be described with reference to FIG. 4. Shown in FIG. 4 is an inputted Japanese character "あ". The frame 401 is used as a reference to obtain a characteristic value. For instance, a frame set on the coordinates input board, or a rectangular frame circumscribing an inputted character, may be utilized as the frame 401. Three strokes constructing the inputted character "あ" are structured by sequences of points. First, a point (so-called a characteristic point) appropriate for describing the stroke is obtained from each of the sequences of points. For instance, in FIG. 4, the start point 402a and end point 402b of the first stroke (402) of the character "あ" are extracted as the characteristic points. Assuming that characteristic points to be extracted are defined in the foregoing manner, the character "あ", constructed by three strokes, is described by a vector having six characteristic points (3×2). In a case each of the characteristic points is described by using X coordinate only, the character "あ", constructed by three strokes, has six dimensions, while if each of the characteristic points is described by using X and Y coordinates, the character has twelve dimensions.

Although the start point and end point of one stroke are utilized as characteristic points, characteristic points may be described by using other coordinates, e.g., ¼ point, half point or ¾ point of each stroke, or a center of gravity of each stroke. Alternately, coordinates of a characteristic point, e.g., the upper-most point, lower-most point, right-most point and left-most point of the entire character, may be used.

As shown in FIG. 4, a difference vector 403, starting at a characteristic point of the first stroke (start point of 403) and ending at a characteristic point of the second stroke (end point of 403), may be used as a coordinate of a characteristic value.

As described above, once the dimensions of the characteristic value space for representing the pattern is determined, each of the coordinate axis is recurrently segmented as shown in FIGS. 3A to 3C. Then, the learning patterns are hierarchized in accordance with the segmented coordinate axis and the hierarchized learning patterns 103 are generated. This is the processing performed by the hierarchical-segmenting preprocessor 102.

Figure 5A:
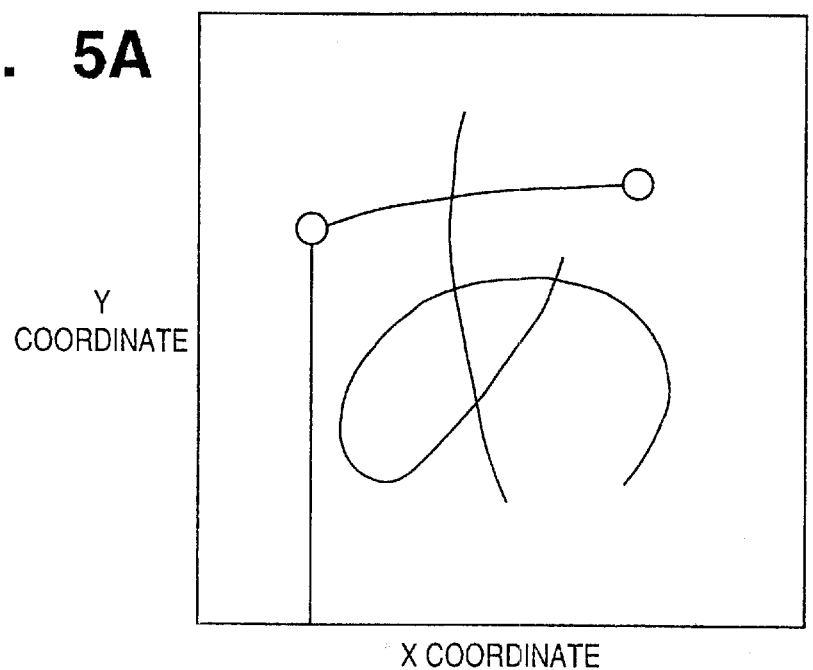
FIGS. 5A to 5C are explanatory views showing the steps of generating a classification tree according to the present embodiment.
Figure 5B:
Figure 5C:
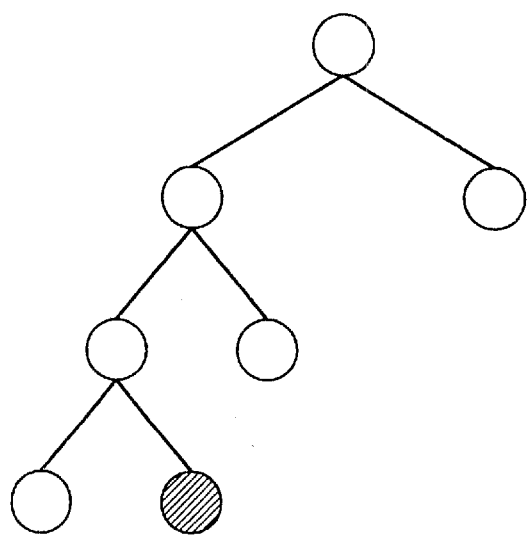
Figure 13:
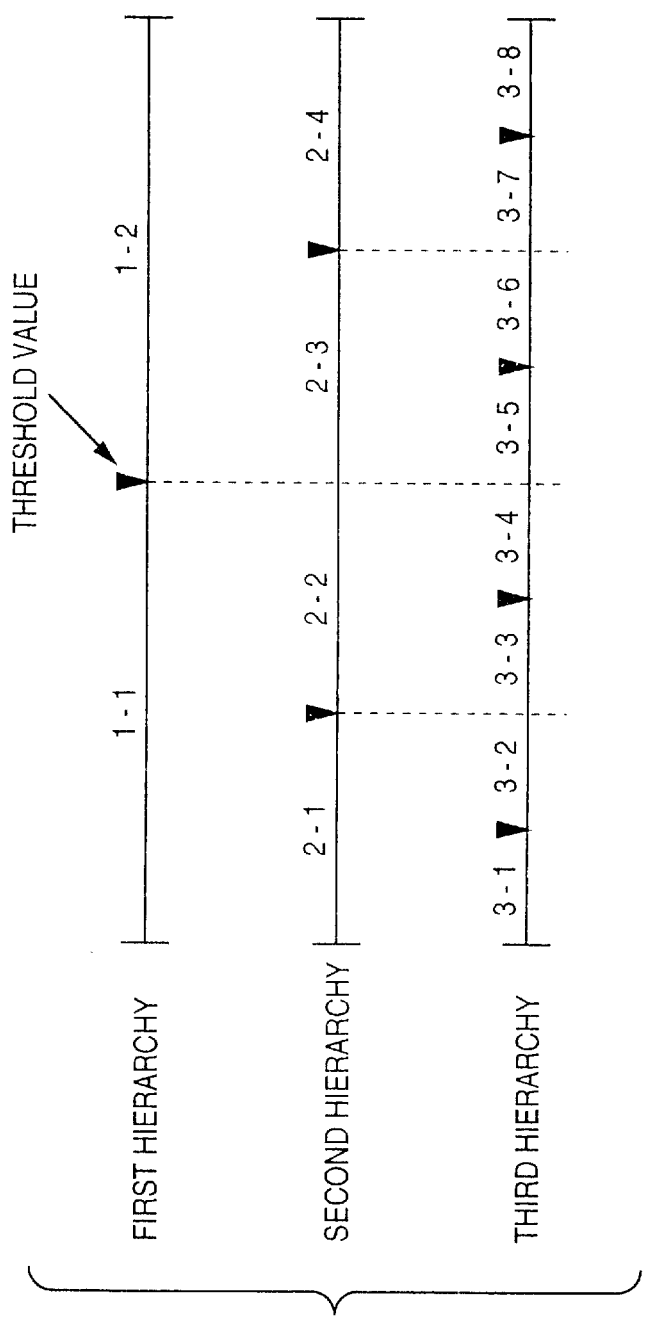
FIG. 13 is a diagram showing an example of hierarchized segments.

FIGS. 5A to 5C are explanatory views showing the steps of generating a classification tree according to the present embodiment. In FIG. 5B, X coordinate axis is recurrently divided in half, three times, ultimately dividing the X coordinate axis in eight segments. Thus, X coordinate axis is segmented into hierarchized segments as shown in FIG. 13. As a result, the start point of the first stroke of the character "あ" shown in FIG. 5A belongs to segments 1-1, 2-1 and 3-2 in FIG. 13. Y coordinate axis is similarly segmented. Note that the X coordinate axis and Y coordinate axis need not be segmented in exactly the same way. Although FIGS. 5A and 5B show segmenting the coordinate axis of the dimension representing X coordinate for the start point of the first stroke, similar segmentation is performed on each x coordinate for the end point of the first stroke, start and end points of the second and third strokes. However, the number of segments needs not be the same for each coordinate axis as mentioned above, and each segment needs not be equal. As a result of the above hierarchizing process, hierarchized learning patterns data are generated as shown in FIG. 14.

Upon segmenting the X coordinate axis as shown in FIG. 5B, a classification tree is generated. For instance, assuming a case where the obtained characteristic value is described only by an X coordinate value of the start point of the first stroke, i.e., the characteristic value has one dimension (=one variable), a classification tree as shown in FIG. 5C is generated from the pattern "あ" of FIG. 5A.

Assuming that the number of dimensions is n (n>1), a classification tree is generated while evaluating which dimension is to be looked at in each node of the classification tree, to attain the highest classification efficiency. The evaluation of classification efficiency is determined by the developing variable determining unit 105. In other words, the developing variable determining unit 105 calculates a classification efficiency based on the predetermined threshold value, using the hierarchized learning pattern 103.

Note that evaluation of classification efficiency can be realized by using the method "Gini Griterion" disclosed in the aforementioned reference "Classification and Regression Trees", or other well-known techniques such as the method adopting "Mutual Information" used generally in information theory.

Figure 6:
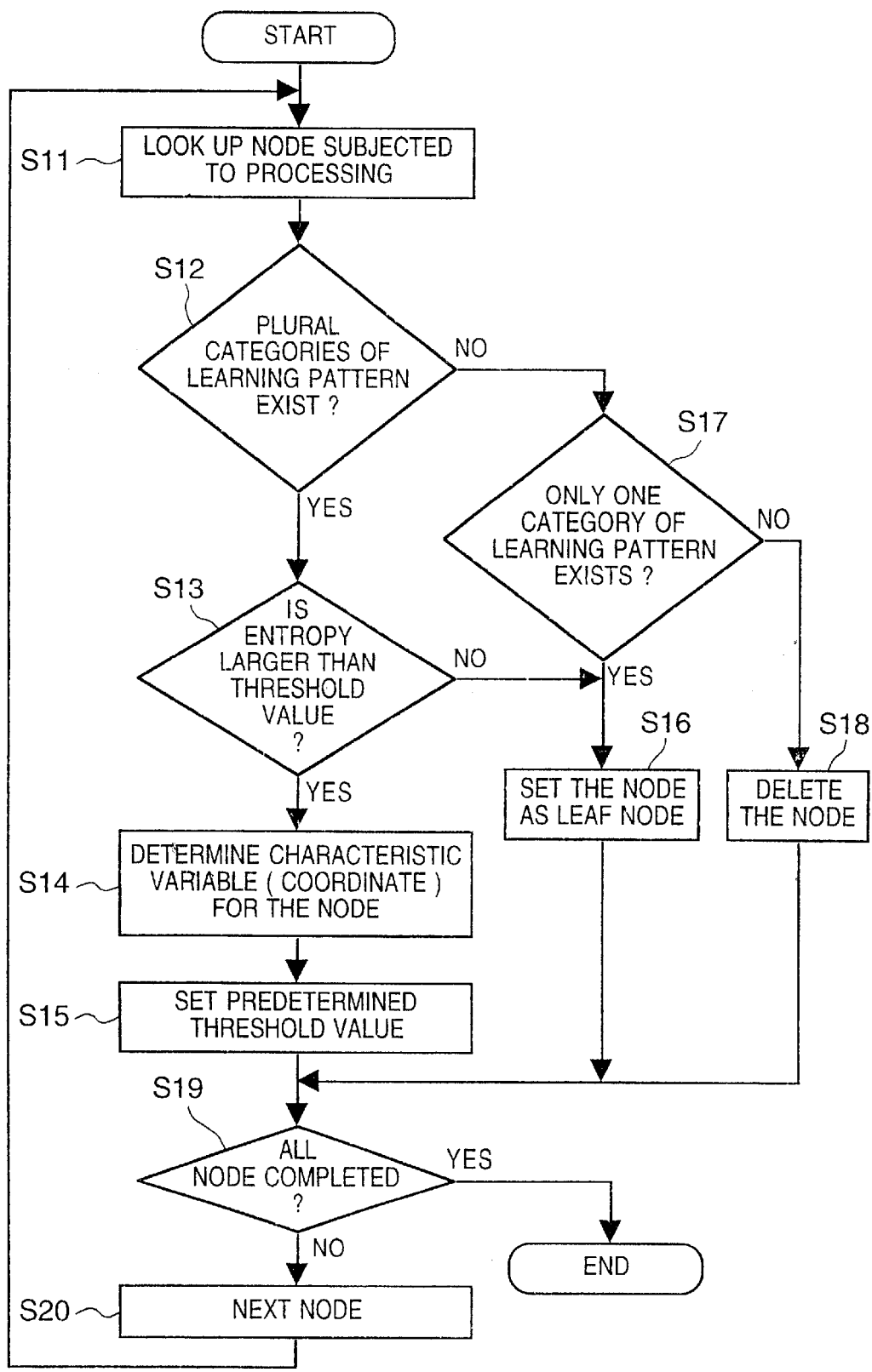
FIG. 6 is a flowchart showing the process of generating a classification tree according to the first embodiment.

Other well-known techniques widely used for generating a classification tree can be employed. For instance, the reference "Classification and Regression Trees" discloses which scale to be used at the time of generating a leaf node. If entropy is to be adopted as the scale, the processing of classification-tree generation according to the present embodiment is executed as shown in FIG. 6. Note that the entropy is defined by $\Sigma$ Pi·logPi.

Referring to FIG. 6, in step S11, a node subjected to processing is looked at. First, the root node of the classification tree is looked at. Since the root node includes learning patterns belonging to plural categories, the processing proceeds from step S12 to S13. In step S13, entropy in the node is calculated. If the obtained entropy is lower than a predetermined threshold value, the processing proceeds to step S16 where the node is set as a leaf node and a category number of highest existing probability is assigned to the node. For instance, if Japanese characters "な" and "は" exist in the same node with a larger number for "な", this node is set as a leaf node of "な". Herein, since the root node cannot be a leaf node, the processing proceeds from step S13 to S14.

In step S14, classification efficiency is determined by the developing variable determining unit 105. Based on the obtained result, "Decision" is made with regard to a dimension (coordinate of characteristic value space) to be used in the node. As a result, in a case of two branch trees, two nodes are newly generated. In other words in general terms, in a case of n branches, n nodes are generated. In step S15, when a dimension is determined (selected) to be used in the node, a threshold value is automatically set to the node based on the hierarchized segmentation previously performed as described above. Then, in order to process each of the generated nodes, the processing returns to step S11.

Figure 7A:
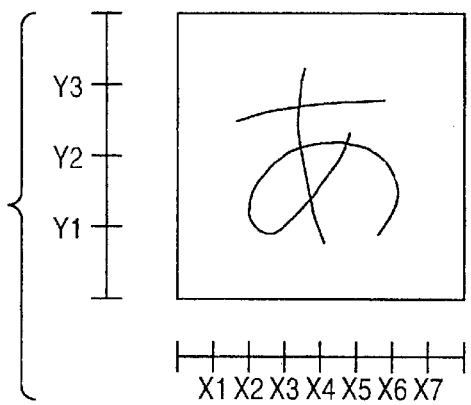
FIGS. 7A to 7C are explanatory views for generating a classification tree in a case of using X and Y coordinates axes of a starting point of a first stroke as dimensions.
Figure 7B:
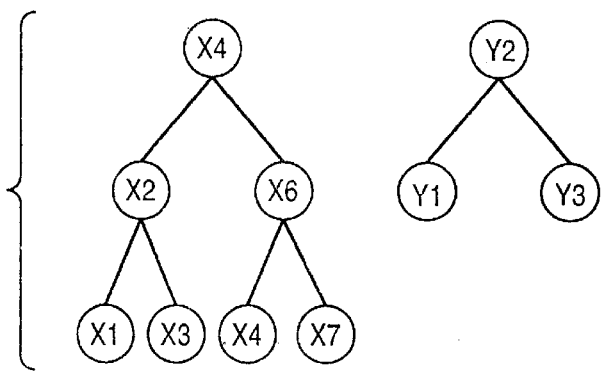
Figure 7C:
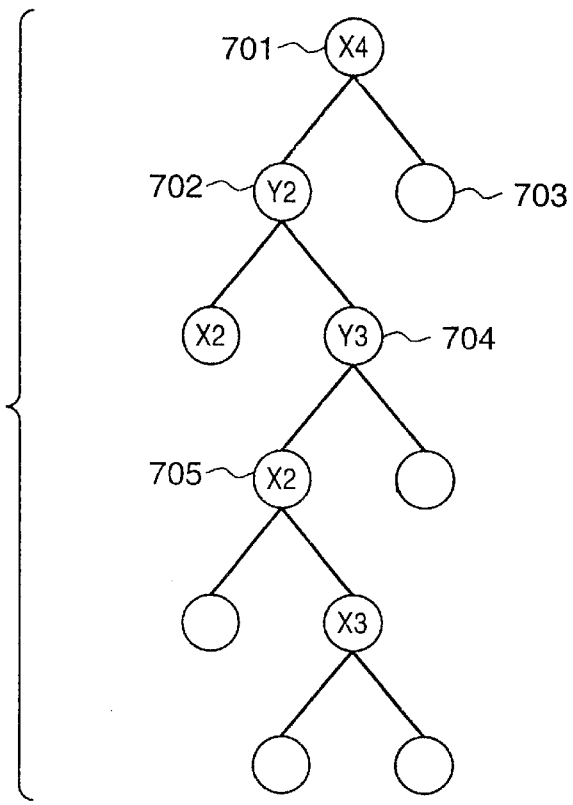

FIGS. 7A to 7C are explanatory views for generating a classification tree in a case of using x and Y coordinates of a starting point of a first stroke as dimensions. In this case, two characteristic variables represent the coordinate of a characteristic value space. As shown in FIG. 7A, the X coordinate axis is segmented into eight segments using seven threshold values (X1 to X7), while Y coordinate axis is segmented into four segments using three threshold values (Y1 to Y3). FIG. 7B shows a hierarchical structure of threshold values in each dimension. For instance, if classification is made that a point of interest exists at left of X4, the next threshold value to be used for comparison is X2.

FIG. 7C is an example of a classification tree generated according to the flowchart shown in FIG. 6. A node 701 is a root node. Since the dimension represented by coordinate X is selected in step S14, X4 is set to the root node 701 as a threshold value in step S15. Then, two nodes 702 and 703 are generated. Next, the process returns to step S11 and the node 702 is looked at. When the node 702 has a learning pattern which belongs to plural categories, the developing variable determining unit 105 determines in step S14, a coordinate to be used in node 702. In the case shown in FIG. 7C, since coordinate Y is selected, Y2 is set to the node 702 as a threshold value in step S15. Similarly, in node 704, coordinate Y is selected, thus Y3 is set to the node 704 as a threshold value; and in node 705, coordinate X is selected, thus X2 is set as a threshold value. Note that each threshold value is set according to a hierarchical structure shown in FIG. 7B. In other words, referring to FIG. 7B, when the classification tree branches from X4 to the left (when the node 701 branches to the left), the next threshold value to be used in a case coordinate X is selected, is X2 (thus, threshold value of the node 705 is X2). If the classification tree branches from X4 to the right, the next threshold value to be used in a case coordinate X is selected, is X6 (thus, threshold value of the node 703 is X6).

Referring back to FIG. 6, in a case where the node subjected to processing includes a learning pattern which belongs to a single category, this node is determined as a leaf node (steps S16 and S17). If the processing branches to NO in step S17, it means that there is no learning pattern. In such case, the node is deleted from the classification tree in step S18.

A classification tree is generated according to the above-described manner, and when the processing completes for all the nodes, the generation of the classification tree ends (steps S19 and S20).

Figure 8:
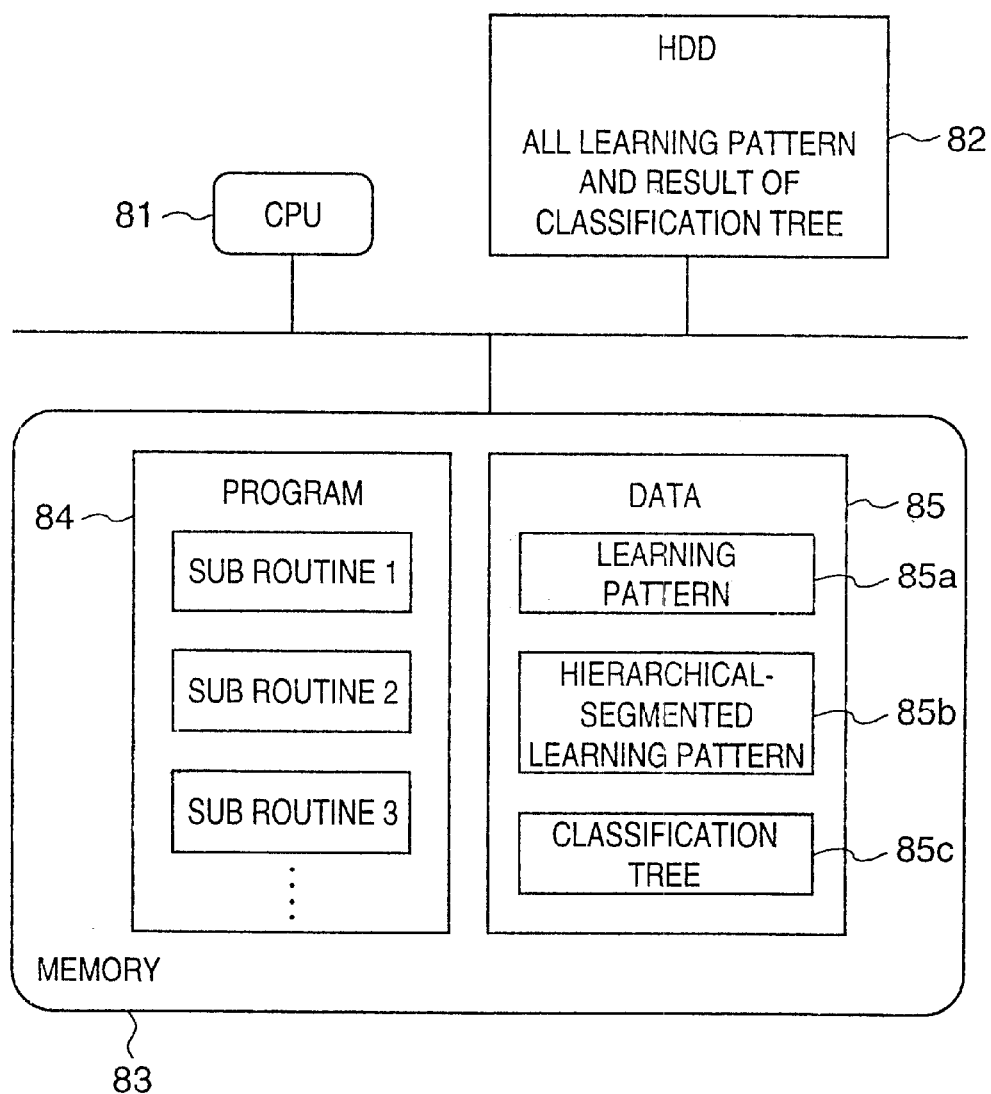
FIG. 8 is a block diagram showing a construction of the data processing apparatus according to a first embodiment.

FIG. 8 is a block diagram showing a construction of the data processing apparatus according to the present embodiment. Reference numeral 81 denotes a CPU for realizing various control according to control programs stored in a memory 83. Reference numeral 82 denotes hard disk where all learning patterns are stored as input data and the results of generated classification trees are stored as output data. Reference numeral 83 denotes a memory including a program portion 84 and data portion 85. The program portion 84 has control programs as sub routines for realizing the processing shown in the flowchart in FIG. 6. The CPU 81 reads out and executes each sub routine. The data portion 85 has a learning pattern buffer 85a for temporarily storing each learning pattern, a learning pattern area 85b for storing hierarchically segmented learning patterns, and a classification tree buffer 85c for storing a classification tree during generation.

In the learning pattern buffer 85a, all learning patterns from the hard disk 82 are serially stored. The learning pattern 103 hierarchized by the hierarchical-segmenting preprocessor 102 is obtained and stored in the hierarchized learning pattern area 85b as shown in FIG. 14. Then, the classification tree generator 104 executes the classification-tree generation steps in FIG. 6 to generate a classification tree.

As has been described above, according to the first embodiment, once a dimension to be used for each node is determined, a predetermined threshold value is automatically set to the node in the hierarchical-segmenting preprocessor 102. By this, the amount of calculation can be decreased and the time necessary for classification-tree generation can be reduced.

Note that although the above description in the first embodiment relates to generation of a classification tree for classifying a three-stroke character, the same description applies to generation of a classification tree for classifying a character having other number of strokes, e.g., a four-stroke character or 2-stroke character.

Second Embodiment

Figure 9:
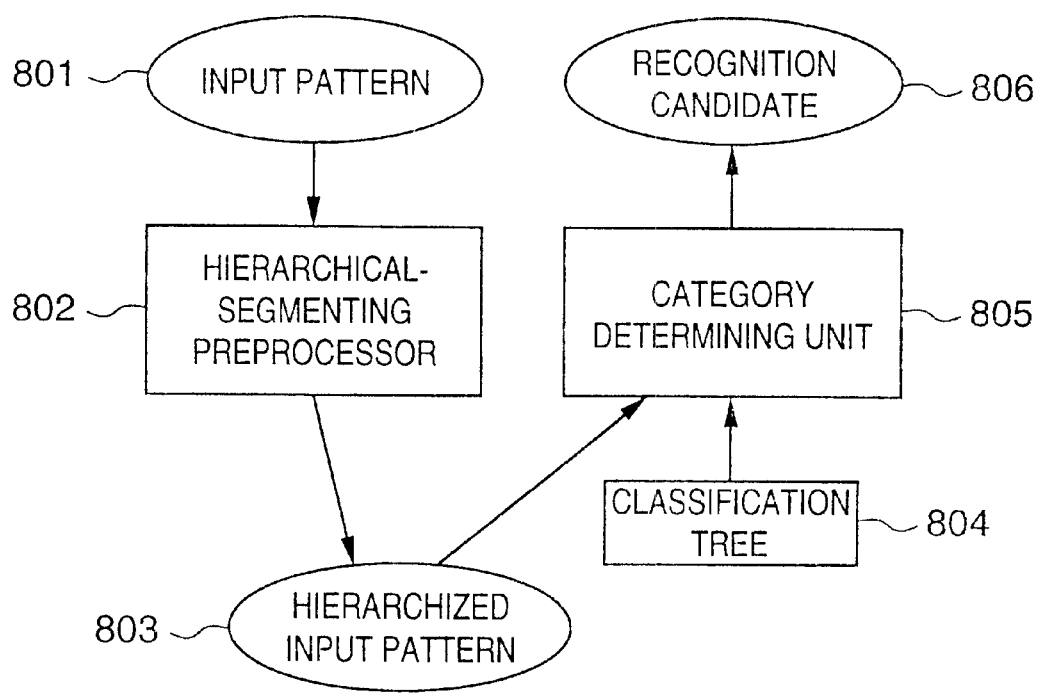
FIG. 9 is a block diagram describing functional configuration of pattern recognition processing according to the second embodiment.

FIG. 9 is a block diagram describing functional configuration of pattern recognition processing according to the second embodiment. Reference numeral 801 denotes an input pattern subjected to recognition (subjected to classification); and 802, a hierarchical-segmenting preprocessor for hierarchically segmenting the input pattern 801. Reference numeral 803 denotes a hierarchized input pattern on which segmentation has been performed; and 804, a classification tree. Reference numeral 805 denotes a category determining unit for determining a determination probability of a category based on the hierarchized input pattern 803 and classification tree 804. It should be noted that in the second embodiment, "input pattern 801" is the input, and "recognition candidate 806" is the output. The classification tree 804 employs a classification tree generated by the method according to the first embodiment.

The input pattern 801 corresponds to the learning patterns 101 described in the first embodiment. The hierarchical-segmenting preprocessor 802 corresponds to the hierarchical-segmenting preprocessor 102 in the first embodiment. Although there are hierarchized learning patterns 103 as many as the number of the inputted learning patterns in the first embodiment, in the second embodiment, there is only one hierarchized input pattern 803 which is derived from the input pattern 801.

The category determining unit 805 performs processing based on the hierarchized input pattern 803, following the classification tree 804. When the category determining unit 805 reaches a leaf node, the determining unit 805 outputs a most probable category in the leaf as a recognition result. In a case where the category determining unit 805 does not reach a leaf node, a category probability (category existing probability), included in the node where the recognition process has last executed, is outputted as a result.

Figure 10:
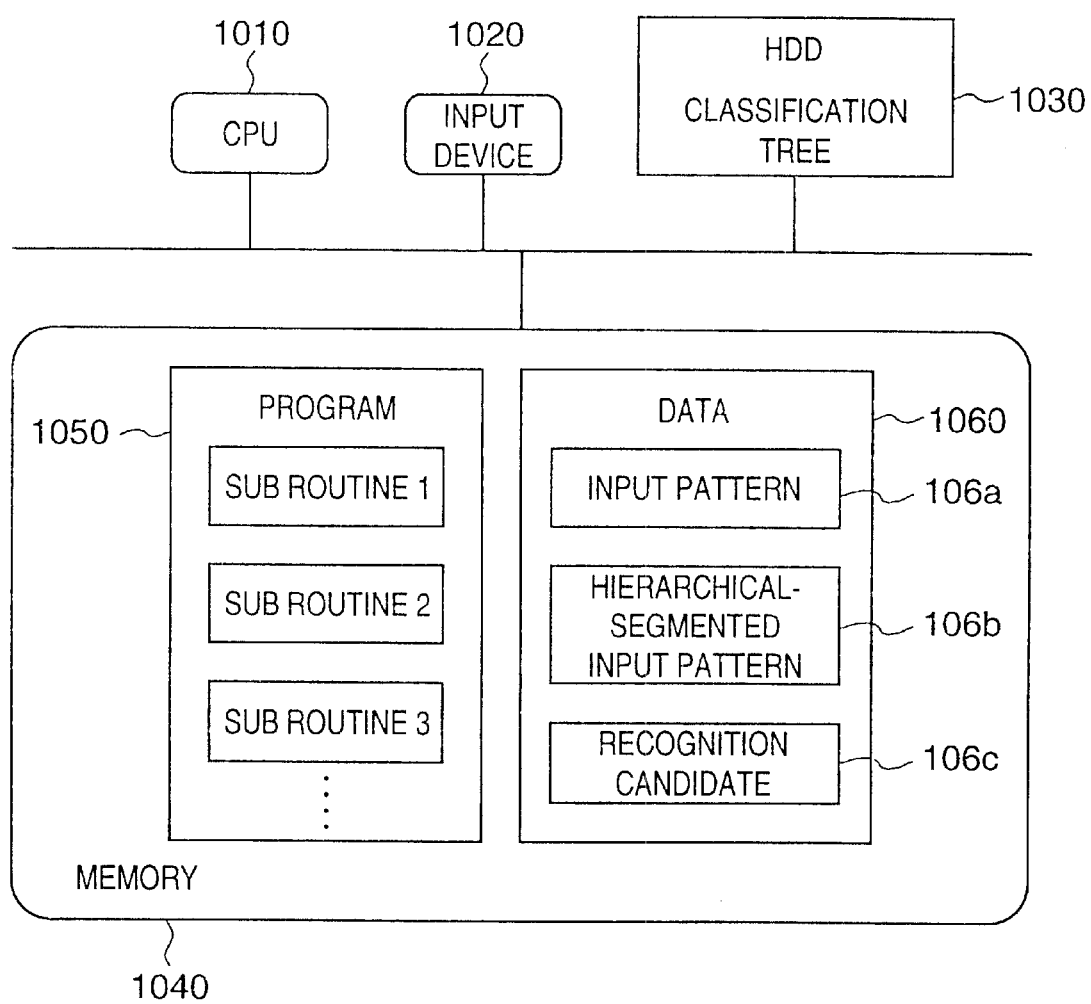
FIG. 10 is a block diagram showing a construction of a data processing apparatus according to a second embodiment.

Next, a construction of the data processing apparatus according to the second embodiment is shown in FIG. 10. Reference numeral 1010 denotes a CPU for realizing various control according to control programs stored in a memory 1040. Reference numeral 1020 denotes an input device used for inputting the input pattern 801. The input device 1020 which is suitable for a pattern subjected to recognition processing is used. For instance, in a case of handwritten-character recognition, a coordinates input apparatus is used, while in a case of audio recognition, a microphone is used. Reference numeral 1030 denotes hard disk for storing classification trees 804. A memory 1040 is divided into a program portion 1050 and a data portion 1060. The program portion 1050 includes each component of the block diagram shown in FIG. 9 as a sub routine. The CPU 1010 reads out and executes the sub routine. The data portion 1060 has an input pattern area 106a for storing input pattern 801 inputted from the input device 1020 by a user, a hierarchized input pattern area 106b for storing the hierarchized input pattern 803, and a recognition candidate area 106c. The category determining unit 805 determines a recognition candidate 806 and stores it in the recognition candidate area 106c of the data portion 1060.

Third Embodiment

Figure 11:
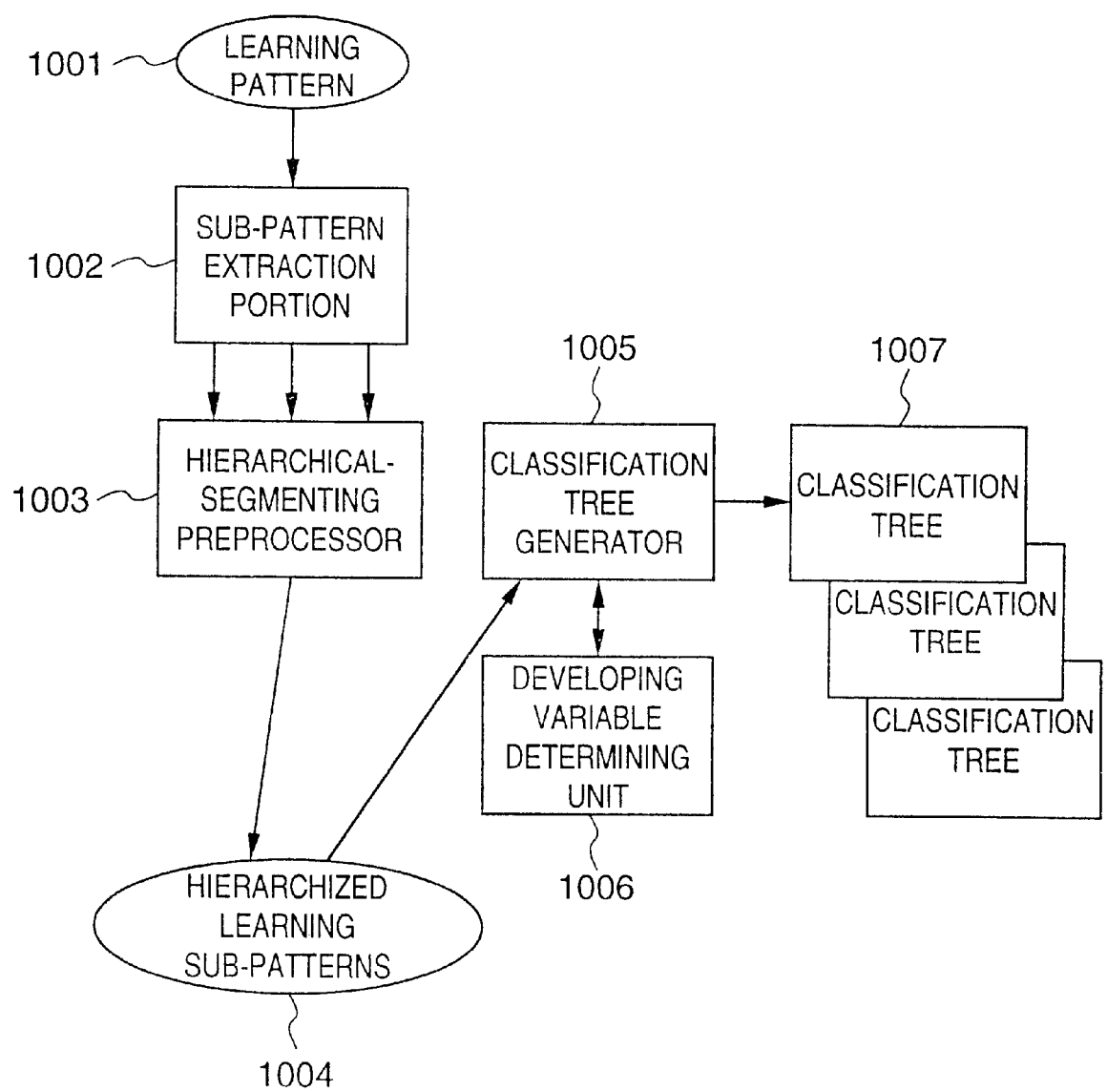
FIG. 11 is a block diagram describing classification-tree-generation function according to a third embodiment.

FIG. 11 is a block diagram describing classification-tree-generation function according to the third embodiment. Reference numeral 1001 denotes a learning pattern; 1002, a sub-pattern extraction portion for extracting the learning pattern 1001 in unit of sub-pattern; 1003, a hierarchical-segmenting preprocessor for hierarchically segmenting the learning sub-pattern; 1004, hierarchized learning sub-patterns on which segmentation has been performed by the hierarchical-segmenting preprocessor 1003; 1005, a classification tree generator for generating a classification tree based on the hierarchized learning sub-patterns 1004; 1006, a developing variable determining unit employed by the classification tree generator 1005 when a classification tree is generated; and 1007, a classification tree obtained as a result of the processing of the classification tree generator 1005. It should be noted that in the third embodiment, "learning pattern 1001" is the input and "classification tree 1007" is the output.

On-line handwritten character recognition mentioned in the first embodiment will be described as an example. In a case where a Japanese character "あ" constructed by three strokes is inputted, if X coordinate values of the start point and end point of the strokes are used for representing characteristic value, the inputted pattern is described by a character vector having six dimensions (3×2) as explained in the first embodiment. For instance, if two dimensions are selected from the six dimensions constructing the characteristic vector, fifteen ($_6C_2$=15) vectors having two dimensions are extracted as sub-patterns. In the third embodiment, a classification tree is generated for each of the fifteen vectors, taking the steps similar to that described in the first embodiment. This method is equivalent to redundantly storing learning pattern data and performing pattern recognition using the learning pattern data. Therefore, by this method, high recognition success rate is achieved even if there are only a small number of learning patterns. It should be noted that as the redundancy enlarges, the total size of all the classification trees generated as a result, will increase.

As an extreme example, if each dimension is extracted from the six dimensions forming the characteristic vector, a classification tree can be generated in the simplest manner and the size of the classification tree can be made small. However, since there is no redundancy, the classification capability declines.

In the case of a vector having six dimensions, different vectors having a maximum of ($_6C_6$+$_6C_5$+$_6C_4$+$_6C_3$+$_6C_2$+$_6C_1$)=63 dimensions can be obtained. If a classification tree is generated for all of these vectors, high redundancy is realized thus a high recognition success rate can be achieved.

Note that the detailed construction of the apparatus according to the third embodiment is basically the same as that of the first embodiment shown in FIG. 7.

As set forth above, since a classification tree can be generated more quickly by using the aforementioned technique of the first embodiment, even though the redundant classification trees are generated as described above, a sufficiently practical throughput can be attained. By generating such redundant classification trees and performing recognition processing as will be described in the fourth embodiment, a high recognition success rate can be achieved.

Fourth Embodiment

Figure 12:
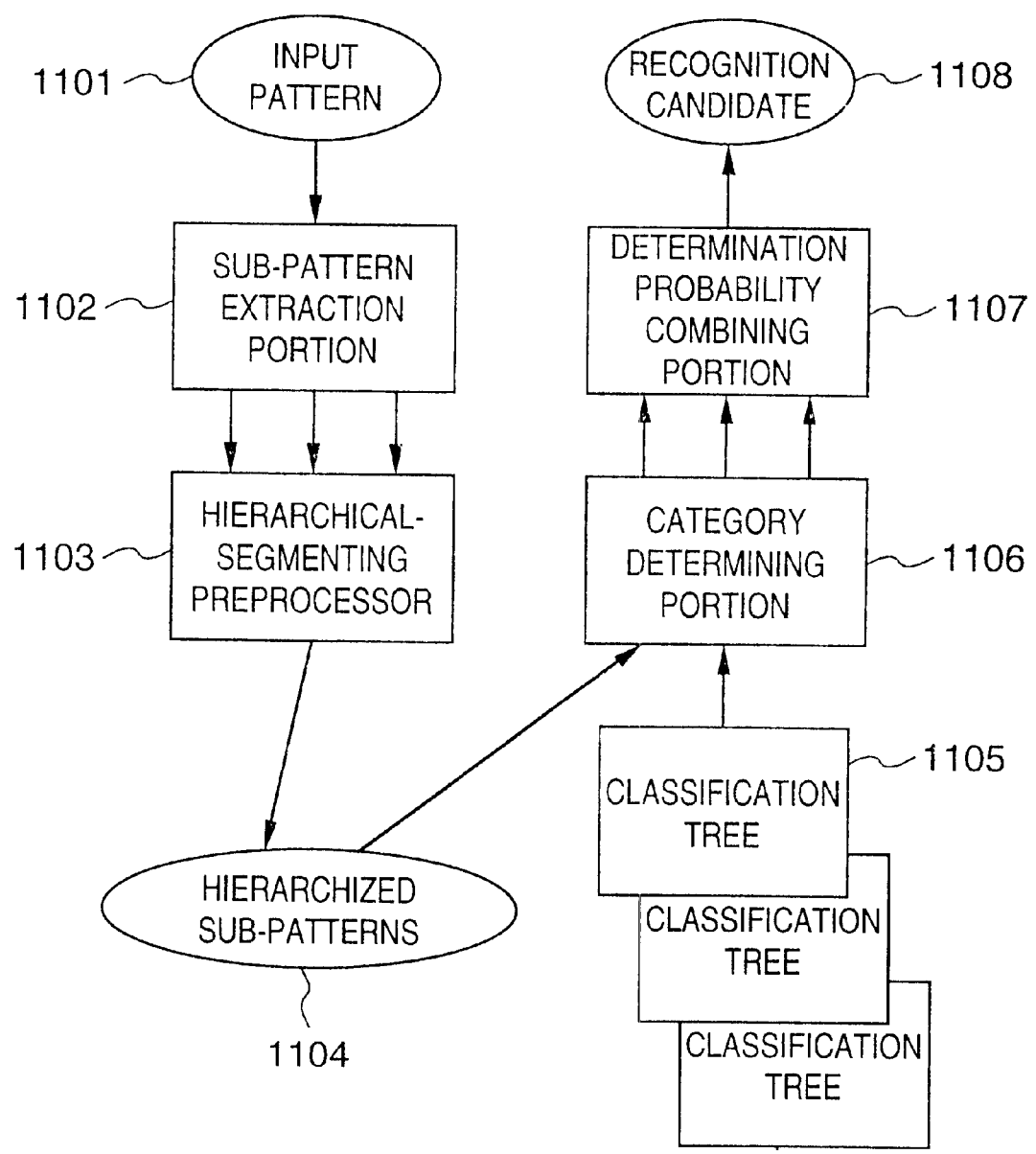
FIG. 12 is a block diagram describing classification-tree-generation function according to a fourth embodiment.

FIG. 12 is a block diagram describing classification-tree-generation function according to the fourth embodiment. Reference numeral 1101 denotes an input pattern; 1102, a sub-pattern extraction portion for extracting the input pattern in unit of sub-pattern; 1103, a hierarchical-segmenting preprocessor for hierarchically segmenting the sub-pattern; 1104, hierarchized sub-patterns on which segmentation has been performed; 1105, a plurality of classification trees generated according to the processing described in the third embodiment; 1106, a category determining portion for obtaining a determination probability of a category based on the hierarchized sub patterns 1104 and classification trees 1105; and 1107, a determination-probability combining portion for combining the determination probability of each category obtained as a result of the processing by category determining portion 1106. It should be noted that in the fourth embodiment, "input pattern 1101" is the input, and "recognition candidate 1108" is the output.

The input pattern 1101 corresponds to the learning pattern 1001 in the third embodiment. The sub-pattern extraction portion 1102 and hierarchical-segmenting preprocessor 1103 respectively correspond to the sub-pattern extraction portion 1002 and hierarchical-segmenting preprocessor 1003 in the third embodiment. Note that although in the third embodiment, there are hierarchized learning sub-patterns 1004 as many as the number of the inputted learning patterns, in the fourth embodiment, there is only one sub-pattern 1104 which is derived from the input pattern 1101.

The determination-probability combining portion 1107 determines a recognition candidate by performing mean value processing, e.g., an arithmetic mean calculation or geometric mean calculation, on the result (category) of the category determining portion 1106 for each sub-pattern.

Note that the detailed construction of the apparatus according to the fourth embodiment is basically the same as that of the second embodiment shown in FIG. 9.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As set forth above, the present invention attains an effect of quickly generating a classification tree for classifying a pattern represented by a characteristic value expressed in plural dimensions.

Furthermore, the present invention provides an effect that high recognition success rate can be realized even if there are a small number of learning patterns.

The present invention is not limited to the above embodiments and various changes and modifications can be made within the spirit and scope of the present invention. Therefore, to appraise the public of the scope of the present invention, the following claims are made.

What is claimed is:

1. A data processing method for generating a plurality of classification trees for classifying a pattern, comprising:

a step of deriving characteristic values of learning sub-patterns from combinations of a predetermined number of characteristic values of learning patterns;

a first generating step of generating a plurality of hierarchical structures by generating, for each of coordinate axes of a characteristic value space, a hierarchical structure of coordinate-axis segments to which each of the characteristic values of the learning sub-patterns belong, the coordinate-axis segments being generated by segmenting the coordinate axis with threshold values; and a second generating step of generating the plurality of classification trees by generating a classification tree for each of the learning sub-patterns by selecting a hierarchical structure from the plurality of generated hierarchical structures in accordance with a classification efficiency on each node of the classification tree.

2. The method according to claim 1, wherein the coordinate-axis segments are generated by recurrently dividing each coordinate axis by n (n is a plural number).

3. The method according to claim 1, wherein a form of segmentation supplied to each coordinate axis is different.

4. The method according to claim 1, wherein in said second generating step, the hierarchical structure which achieves the highest classification efficiency of the plurality of learning patterns is selected in the node of interest of the classification tree subjected to generation.

5. The method according to claim 1, wherein in said second generating step, the classification tree is generated in accordance with the coordinate-axis segments of the selected hierarchical structure.

6. The method according to claim 1, further comprising a step of storing classification tree data generated in said second generating step.

7. The method according to claim 6, further comprising a step of recognizing an inputted pattern based on the classification tree data stored in said storing step.

8. The method according to claim 7, wherein said recognizing step comprises:

a first obtaining step of obtaining characteristic values of input sub-patterns from characteristic values of an inputted pattern in accordance with the combination used in said deriving step;

a step of classifying each of the characteristic values of input sub-patterns, based on the classification tree generated in said second generating step; and a step of recognizing the inputted pattern based on the classification results of the characteristic values of input sub-patterns.

9. The method according to claim 8, wherein in said classifying step, the input sub-pattern is classified based on each coordinate of the characteristic value of the input sub-pattern and the classification tree generated in said second generating step.

10. A data processing apparatus for generating a plurality classification trees for classifying a pattern, comprising:

deriving means for deriving characteristic values of learning sub-patterns from combinations of a predetermined number of characteristic values of learning patterns;

first generating means for generating a plurality of hierarchical structures by generating, for each of coordinate axes of a characteristic value space, a hierarchical structure of coordinate-axis segments to which each of the characteristic values of the learning sub-patterns belong, the coordinate-axis segments being generated by segmenting the coordinate axis with threshold values; and second generating means for generating the plurality of classification trees by generating a classification tree for each of the learning sub-patterns by selecting a hierarchical structure from the plurality of generated hierarchical structures in accordance with a classification efficiency on each node of the classification tree.

11. The apparatus according to claim 10, wherein the coordinate-axis segments are generated by recurrently dividing each coordinate axis by n (n is a plural number).

12. The apparatus according to claim 10, wherein a form of segmentation for each coordinate axis is different.

13. The apparatus according to claim 10, wherein said second generating means selects the hierarchical structure which achieves the highest classification efficiency of the plurality of learning patterns in the node of interest of the classification tree subjected to generation.

14. The apparatus according to claim 10, wherein said second generating means generates a classification tree in accordance with the coordinate-axis segments of the selected hierarchical structure.

15. The apparatus according to claim 10, further comprising storage means for storing classification tree data generated by said second generating means.

16. The apparatus according to claim 15, further comprising recognizing means for recognizing an inputted pattern based on the classification tree data stored in said storage means.

17. The apparatus according to claim 16, wherein said recognizing means comprises:

first obtaining means for obtaining characteristic values of input sub-patterns from characteristic values of an inputted pattern in accordance with the combination used by said deriving means;

classifying means for classifying each of the characteristic values of input sub-patterns, based on the classification tree generated by said second generating means; and recognizing means for recognizing the inputted pattern based on the classification results of the characteristic values of input sub-patterns.

18. The apparatus according to claim 17, wherein said classifying means classifies the input sub-pattern based on each coordinate of the characteristic value of the input sub-pattern and the classification tree generated by said second generating means.

19. A memory medium storing a control program for causing a computer to execute processing for generating a plurality of classification trees for classifying a pattern, comprising:

codes for a step of deriving characteristic values of learning sub-patterns from combinations of a predetermined number of characteristic values of learning patterns;

codes for a first generating step of generating a plurality of hierarchical structures by generating, for each of coordinates axes of a characteristic value space, a hierarchical structure of coordinate-axis segments to which each of the characteristic values of the learning sub-patterns belong, the coordinate axis segments being generated by segmenting the coordinate axis with threshold values; and codes for a second generating step of generating the plurality of classification trees by generating a classification tree for each of the learning sub-patterns by selecting a hierarchical structure from the plurality of generated hierarchical structures in accordance with a classification efficiency on each node of the classification tree.

20. A data processing method for generating a classification tree for classifying a pattern, comprising:

a first generating step of generating a plurality of hierarchical structures by generating, for each of coordinate axes of a characteristic value space, a hierarchical structure of coordinate-axis segments to which characteristic values of the learning patterns belong, the coordinate-axis segments being generated by segmenting the coordinate axis with threshold values; and a second generating step of generating a classification tree for the learning patterns, by selecting a hierarchical structure from the plurality of generated hierarchical structures in accordance with a classification efficiency on each node of the classification tree.

21. The method according to claim 20, wherein the coordinate-axis segments are generated by recurrently dividing each coordinate axis by n (n is a plural number).

22. The method according to claim 20, wherein a form of segmentation applied to each coordinate axis is different.

23. The method according to claim 20, wherein in said second generating step, the hierarchical structure which achieves the highest classification efficiency of the plurality of learning patterns is selected in the node of interest of the classification tree subjected to generation.

24. The method according to claim 20, wherein in said second generating step, the classification tree is generated in accordance with the coordinate-axis segments of the selected hierarchical structure.

25. The method according to claim 20, further comprising a step of storing data of the classification tree generated in said second generating step.

26. The method according to claim 25, further comprising a step of recognizing an input pattern based on the classification tree data stored in said storing step.

27. The method according to claim 26, wherein said recognizing step comprises:

a first obtaining step of obtaining characteristic values of the input pattern;

a step of classifying each of the characteristic values of the input pattern, based on the classification tree generated in said second generating step; and a step of recognizing the input pattern based on the result classified in said classifying step.

28. The method according to claim 27, wherein in said classifying step, the input pattern is classified based on each coordinate of the characteristic value of the input pattern and the classification tree generated in said second generating step.

29. A data processing apparatus for generating a classification tree for classifying a pattern, comprising:

first generating means for generating a plurality of hierarchical structures by generating, for each of coordinate axes of a characteristic value space, a hierarchical structure of coordinate-axis segments to which characteristic values of the learning patterns belong, the coordinate-axis segments being generated by segmenting the coordinate axis with threshold values; and second generating means for generating a classification tree for the learning patterns, by selecting a hierarchical structure from the plurality of generated hierarchical structures in accordance with a classification efficiency on each node of the classification tree.

30. The apparatus according to claim 29, wherein the coordinate-axis segments are generated by recurrently dividing each coordinate axis by n (n is a plural number).

31. The apparatus according to claim 29, wherein a form of segmentation applied to each coordinate axis is different.

32. The apparatus according to claim 29, wherein said second generating means selects the hierarchical structure which achieves the highest classification efficiency of the plurality of learning patterns in the node of interest of the classification tree subjected to generation.

33. The apparatus according to claim 29, wherein said second generating means generates the classification tree in accordance with the coordinate-axis segments of the selected hierarchical structure.

34. The apparatus according to claim 29, further comprising means for storing data of the classification tree generated by said second generating means.

35. The apparatus according to claim 34, further comprising means for recognizing an input pattern based on the classification tree data stored by said storing means.

36. The apparatus according to claim 35, wherein said recognizing means comprises:

first obtaining means for obtaining characteristic values of the input pattern;

means for classifying each of the characteristic values of the input pattern, based on the classification tree generated by said second generating means; and means for recognizing the input pattern based on the result classified by said means for classifying.

37. The apparatus according to claim 36, wherein in said means for classifying, the input pattern is classified based on each coordinate of the characteristic value of the input pattern and the classification tree generated by said second generating means.

38. A memory medium storing a control program for causing a computer to execute processing for generating a classification tree for classifying a pattern, comprising:

codes for a first generating step of generating a plurality of hierarchical structures by generating, for each of coordinate axes of a characteristic value space, a hierarchical structure of coordinate-axis segments to which characteristic values of the learning patterns belong, the coordinate-axis segments being generated by segmenting the coordinate axis with threshold values; and codes for a second generating step of generating a classification tree for the learning patterns, by selecting a hierarchical structure from the plurality of generated hierarchical structures in accordance with a classification efficiency on each node of the classification tree.

* * * * *